2,867,667

Patented Jan. 6, 1959

2,867,667

OLEFIN OXIDE ORTHO ESTER CONDENSATION PRODUCTS

Otis C. Dermer, Stillwater, Okla., and Frank Bier Slezak, Painesville, Ohio, assignors to Cities Service Research and Development Company, New York, N. Y., a corporation of New Jersey No Drawing. Application May 29, 1958
Serial No. 738,642

15 Claims. (Cl. 260—615)

This invention relates to novel organic compounds, and more particularly to addition compounds of olefin oxides with orthoformates.

This application is a continuation-in-part of our copending application Serial No. 369,728, filed July 22, 1953, and now abandoned.

We have discovered that olefin oxides, such as ethylene oxide and propylene oxide, may be reacted with orthoformates, such as ethyl orthoformate, in the cold and in the presence of boron trifluoride as a catalyst to produce adducts having the generic formula

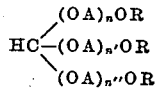

in which A is a bivalent hydrocarbon radical selected from the group consisting of ethylene and propylene; $n$ is an integer from 1 to 4 inclusive; $n'$ and $n''$ are any integers from 0 to 4 inclusive; and R is an alkyl group having from 1 to 5 carbon atoms.

Examples of such compounds produced by the reaction of ethylene oxide and ethyl orthoformate are as follows:

The 1 oxide: 1 orthoester adduct $$HC(OC_2H_5)_2(OCH_2CH_2OC_2H_5) \quad (I)$$

Diethyl 2-ethoxyethyl orthoformate

The 2 oxide: 1 orthoester adducts $$HC(OC_2H_5)_2(OCH_2CH_2OCH_2CH_2OC_2H_5) \quad (II)$$

Diethyl 2-(2-ethoxyethoxy)ethyl orthoformate $$HC(OC_2H_5)(OCH_2CH_2OC_2H_5)_2 \quad (III)$$

Ethoxy-bis-(2-ethoxyethoxy)methane or

Ethyl bis-2-ethoxyethyl orthoformate

The 3 oxide: 1 orthoester adducts

(OCH$_2$CH$_2$OCH$_2$CH$_2$OCH$_2$CH$_2$OC$_2$H$_5$)  (IV)

Diethyl 2-(2-(2-ethoxyethoxy)ethoxy)ethyl orthoformate

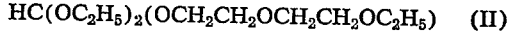

ethyl 2-ethoxyethyl 2-(2-ethoxyethoxy)ethyl orthoformate $$HC(OCH_2CH_2OC_2H_5)_3 \quad (VI)$$

Tris-(2-ethoxyethoxy)methane or

Tris-2-ethoxyethyl orthoformate

It is believed that propylene oxide and ethyl orthoformate give the same types of isomers as noted above. However, they introduce new possibilities of isomerism because of the fact that the propylene oxide ring can open in either of two ways. It can be shown that there must be 2 isomers corresponding to I, 4 to II, 3 to III, 8 to IV, 6 to V, and 4 to VI.

We have found that the reaction will proceed smoothly at temperatures in the neighborhood of 0° C. or below, in the presence of 0.5% or less of boron trifluoride. Even at room temperature the catalyst degrades and destroys the orthoformate quite rapidly, so that it is essential to maintain low temperatures during the reaction. Catalyst concentrations higher than 0.5% are unsatisfactory, leading to decomposition of the orthoformate, and a consequent lowering of the yield of the desired products. Boron fluoride is the only substance known to us to catalyze the reaction, since attempts to condense ethyl orthoformate with ethylene oxide by means of sulfuric acid or stannic chloride catalyst at or below room temperature gave only the recovered ester and its hydrolysis products. The same reagents gave the same results when the catalyst used was hydrated calcium silicate. Attempted uncatalyzed thermal condensation of the oxide and the orthoester also gave no reaction. In order to illustrate our invention more clearly, the following examples are given:

EXAMPLE 1

(a) *Preparative data*

Boron trifluoride (1.5 g., 0.02 mole) was dissolved in 300 g. (2 moles) ethyl orthoformate. This solution was added to a one-liter, three-necked flask equipped with an ice-water-cooled reflux condenser, a power stirrer, and a thermometer. The reaction flask was immersed in an ice bath.

Ethylene oxide (22 g., 0.5 mole) was dissolved in 150 g. (1 mole) of chilled ethyl orthoformate. This mixture was added with stirring to the catalyst solution at such a rate as to maintain the reaction temperature between 3 and 6° C. Forty-five minutes were required for the addition. The reaction mixture was then stirred at ice-bath temperature for an additional five hours.

Anhydrous potassium carbonate (25 g.) in about 30 ml. of water was added to neutralize the boron trifluoride. The solution became somewhat milky as the neutralization took place. Stirring was continued an additional thirty minutes and then 50 g. of anhydrous sodium sulfate was stirred into the mixture. After fifteen minutes, the stirrer was shut off and the mixture allowed to warm to room temperature overnight.

The solids were filtered off and washed with ethyl ether, the ether washings were combined with the filtrate, and the mixture was distilled at atmospheric pressure to remove the ethyl ether, ethyl orthoformate decomposition products and finally the excess ethyl orthoformate. The residue was then distilled at reduced pressure on a Todd column to separate the products.

About 45 g. of material corresponding to I (1 oxide: 1 orthoester adduct) was obtained boiling at 112–117° C./35 mm. Ten grams of material corresponding to II and III (2 oxide: 1 orthoester adduct isomers) was obtained boiling at 156–158° C./35 mm.

Another reaction using a lower ratio of orthoester to ethylene oxide also yielded some material corresponding to IV, V and VI (3 oxide: 1 orthoester adduct isomers) boiling at 149–158° C./1 mm. or 184–187° C./36 mm.

(b) *Analytical data*

The carbon and hydrogen values of the above products were determined by standard microanalytical techniques.

1 oxide: 1 orthoester adduct (I)

|  | Calculated for $C_9H_{20}O_4$ | Experimental Average |
| --- | --- | --- |
| Percent C | 56.22 | 56.40 |
| Percent H | 10.49 | 10.51 |

2 oxide: 1 orthoester adduct isomers (II and III)

|  | Calculated for $C_{11}H_{24}O_5$ | Experimental Average |
| --- | --- | --- |
| Percent C | 55.90 | 55.77 |
| Percent H | 10.23 | 10.36 |

3 oxide: 1 orthoester adduct isomers (IV, V and VI)

|  | Calculated for $C_{13}H_{28}O_6$ | Experimental Average |
| --- | --- | --- |
| Percent C | 55.69 | 55.84 |
| Percent H | 10.06 | 10.36 |

(c) Physical constants

The boiling ranges tabulated below were determined during the analytical distillations of the reaction mixtures. The refractive indices were determined by means of an Abbé-type refractometer with prisms maintained at 20° C. The specific gravity was determined by the use of a 1 ml. pycnometer and referred to water at 20° C. The molar refractions were calculated by means of the Lorentz-Lorenz equation using the theoretical molecular weight of the compound in conjunction with the experimentally derived refractive index and density. The theoretical molar refraction was obtained from the sum of the atomic refractions for the postulated structures.

1 OXIDE : 1 ORTHOESTER ADDUCT (I)

Boiling range _____ 115–117° C./36 mm.
Refractive index 20° C. _____ 1.4060
Specific gravity, 20°/20° _____ 0.9270
Density, 20°, g./ml. _____ 0.9254
Experimental molar refraction _____ 51.02
Theoretical molar refraction _____ 50.33

2 OXIDE : 1 ORTHOESTER ADDUCT ISOMERS (II AND III)

Boiling range _____ 157–159° C./36 mm.
Refractive index, 20° C. _____ 1.4190
Specific gravity, 20°/20° _____ 0.9842
Density, 20°, g./ml. _____ 0.9824
Experimental molar refraction _____ 60.62
Theoretical molar refraction _____ 60.21

3 OXIDE : 1 ORTHOESTER ADDUCT ISOMERS (IV, V, AND VI)

Boiling range _____ 184–187° C./36 mm.
Refractive index, 20° C. _____ 1.4208
Specific gravity, 20°/20° _____ 0.9905
Density, 20°, g./ml. _____ 0.9887
Experimental molar refraction _____ 71.85
Theoretical molar refraction _____ 72.09

(d) Proof of structure

Proof of structure was accomplished by hydrolysis of the ethylene oxide-ethyl orthoformate adduct isomers and identification of the fragments.

The general procedure used was to reflux 15–20 ml. of the material to be hydrolyzed for about two hours with 30–50 ml. of 6N hydrochloric acid. After cooling, the solution was neutralized with anhydrous potassium carbonate, and a large excess of the carbonate was used to salt out the organic material. The organic layer was removed and the solids extracted with ethyl ether. The ether washings were combined with the organic layer for distillation on a Todd column.

Distillation of the hydrolysis products from the 1 ethylene oxide: 1 ethyl orthoformate adduct yielded ethanol and 2-ethoxyethanol. The latter was identified by the formation of the 3,5-dinitrobenzoate. The derivative melted at 67–69° C. A mixture of the above derivative with the 3,5-dinitrobenzoate of a known sample of 2-ethoxyethanol melted at 68–70° C.

The fact that no products other than ethanol and 2-ethoxyethanol were found as alcohols shows that the 1:1 compound is I.

Distillation of the hydrolysis products from the 2 ethylene oxide: 1 ethyl orthoformate adduct isomer mixture yielded ethanol, 2-ethoxyethanol, and some material of B. P. 185–195° believed to be 2-(2-ethoxyethoxy)ethanol (literature B. P., 202°). The 2-ethoxyethanol was again identified by the formation of the 3,5-dinitrobenzoate. No satisfactory derivative of the higher-boiling material could be obtained. About four times as much 2-ethoxyethanol as the higher-boiling material was obtained. The only other material which might be present and which would have a boiling range in the region observed for the high-boiling material would be ethylene glycol. The product received was found to be miscible with petroleum ether whereas ethylene glycol was found to be insoluble. Thus the high-boiling material is in all probability 2-(2-ethoxyethoxy) ethanol.

From the hydrolysis fragments received, it follows that the 2:1 product is an isomeric mixture of II and III.

Distillation of the hydrolysis products from the 3 ethylene oxide: 1 ethyl orthoformate adduct isomers yielded ethanol, 2-ethoxyethanol, 2-(2-ethoxyethoxy)ethanol and some still higher-boiling material believed to be 2-(2-(2-ethoxyethoxy)ethoxy)ethanol. The 2-ethoxyethanol was again identified as the 3,5-dinitrobenzoate. Again no derivative of the 2-(2-ethoxyethoxy)ethanol could be obtained. It was assumed to be the material stated on the basis of boiling range (194–197° C.) solubility in water and petroleum ether, and refractive index.

|  | Observed at 20° | Literature at 25° |
| --- | --- | --- |
| refractive index of different samples | 1.4238<br>1.4236<br>1.4236 | 1.4244 |

Since only a small amount (1–2 ml.) of material boiling above 197° C. was obtained, no identification of the material could be made. It is however likely to have been 2-(2-(2-ethoxyethoxy)ethoxy)ethanol.

On the basis of the hydrolysis fragments obtained, it readily follows that the 3:1 adduct is an isomeric mixture of IV, V, and VI.

EXAMPLE 2

(a) Preparative data

Boron trifluoride (1.5 g., 0.02 mole) was dissolved in 300 g. (2 moles) of ethyl orthoformate. This solution was added to a one-liter three-necked flask equipped with an ice-water-cooled reflux condenser, a power stirrer and a thermometer. The reaction flask was immersed in an ice bath.

Propylene oxide (30 g., 0.5 mole) was dissolved in 150 g. (1 mole) of chilled ethyl orthoformate. This solution was added with stirring to the catalyst solution at such a rate as to maintain the reaction temperature between 3 and 8° C. About an hour was required for the addition. The reaction mixture was then stirred at ice-bath temperature for an additional seven hours.

Anhydrous potassium carbonate (30 g.) in about 30 ml. of water was added to neutralize the boron trifluoride. Stirring was continued twenty minutes and then 50 g. of anhydrous sodium sulfate was added. After thirty minutes the stirrer was shut off and the mixture allowed to warm to room temperature overnight.

The solids were filtered off and washed with ether. The ether washings were combined with the filtrate and the mixture distilled at atmospheric pressure to remove the ethyl ether, ethyl orthoformate decomposition products and finally the excess ethyl orthoformate. The residue was then distilled at reduced pressure in a Todd column to separate the products.

A 37% yield, based on propylene oxide, of the 1 oxide:1 orthoester adduct isomers was obtained boiling at 113–119° C./36 mm. A 20% yield of the 2 oxide:1 orthoester adduct isomers was obtained boiling at 151–153° C./36 mm. An 11% yield of 3 oxide:1 orthoester adduct isomers was obtained boiling at 172–179° C./36 mm.

(b) *Analytical data*

The carbon and hydrogen values of the above products were determined as before by standard microanalytical techniques

1 PROPYLENE OXIDE:1 ETHYL ORTHOFORMATE ADDUCT ISOMERS

|  | Calculated for $C_{10}H_{22}O_4$ | Experimental Average |
| --- | --- | --- |
| Percent C | 58.22 | 57.99 |
| Percent H | 10.75 | 11.12 |

2 PROPYLENE OXIDE:1 ETHYL ORTHOFORMATE ADDUCT ISOMERS

|  | Calculated for $C_{13}H_{28}O_5$ | Experimental Average |
| --- | --- | --- |
| Percent C | 59.05 | 58.40 |
| Percent H | 10.67 | 10.71 |

3 PROPYLENE OXIDE:1 ETHYL ORTHOFORMATE ADDUCT ISOMERS

|  | Calculated for $C_{16}H_{34}O_6$ | Experimental Average |
| --- | --- | --- |
| Percent C | 59.59 | 59.71 |
| Percent H | 10.62 | 10.94 |

(c) *Physical constants*

The same procedures were used as for the determination of the physical constants of the ethylene oxide-ethyl orthoformate adducts.

1 PROPYLENE OXIDE: 1 ETHYL ORTHOFORMATE ADDUCT ISOMERS

Boiling range _____ 113–119° C./36 mm.
Refractive index, 20° C _____ 1.4040
Density, 20°, g./ml _____ 1.9123
Experimental molar refraction _____ 55.28
Theoretical molar refraction _____ 54.95

2 PROPYLENE OXIDE: 1 ETHYL ORTHOFORMATE ADDUCT ISOMERS

Boiling range _____ 151–153° C./36 mm.
Refractive index, 20° C _____ 1.4169
Density, 20°, g./ml _____ 0.9411
Experimental molar refraction _____ 70.62
Theoretical molar refraction _____ 70.45

3 PROPYLENE OXIDE: 1 ETHYL ORTHOFORMATE ADDUCT ISOMERS

Boiling range _____ 172–179° C./36 mm.
Refractive index, 20° C _____ 1.4211
Density, 20° C., g./ml _____ 0.9572
Experimental molar refraction _____ 85.43
Theoretical molar refraction _____ 85.95

(d) *Proof of structure*

No attempt was made to prove the structure of these compounds on account of the large variety of isomers that would undoubtedly result from the hydrolysis of the adducts. The structure of these compounds must follow by analogy to the ethylene oxide-ethyl orthoformate adducts.

In a manner similar to that set forth in the foregoing examples, other orthoformates may be reacted with ethylene oxide or propylene oxide. Typical orthoformates suitable for this purpose are methyl orthoformate, propyl orthoformate, butyl orthoformate and amyl orthoformate. The examples which follow are typical of the preparation of condensation products with the foregoing compounds.

EXAMPLE 3

Boron trifluoride (1.5 g., 0.02 mole) was passed into methyl orthoformate (106 g., 1 mole) at 0°. The resulting solution was transferred to a one-liter three-neck flask equipped with an efficient power stirrer, a thermometer, and an ice-water-cooled reflux condenser. The reaction flask was immersed in an ice bath. An additional 106 g. (1 mole) of chilled methyl orthoformate were used to rinse the catalyst solution into the reaction flask.

Ethylene oxide (50 ml., 1 mole) and methyl orthoformate (106 g., 1 mole) at 0° were mixed and the resulting solution added to the catalyst solution, with stirring, over a 1.5-hour period. The temperature of the reaction mixture was maintained between 3 and 5°.

After all the ethylene oxide solution had been added, the mixture was stirred at 0–5° an additional three hours and then was treated with 30 g. of anhydrous potassium carbonate in about 30 ml. of water. Over a 30–45 minute period of stirring, the mixture change in color from a deep brown-red, through a wine color, to a yellow-orange solution. Anhydrous sodium sulfate (30–40 g.) was then added to the reaction mixture and stirring was continued an additional 30 minutes.

The solids were filtered off and washed with two 25-ml. portions of ethyl ether. The ether washings were combined with the organic filtrate and the mixture was distilled. After the ethyl ether, methyl orthoformate decomposition products, and excess methyl orthoformate were removed, 30 g. (20% yield) of dimethyl 2-methoxyethyl orthoformate were obtained boiling at 172–174°/743 mm. The residue distilled with decomposition even at reduced pressure (20 mm.)

The physical properties of this dimethyl 2-methoxyethyl orthoformate are as follows:

Boiling range _____ 172–174°/743 mm.
$n_D^{20}$ _____ 1.4012
$d_{20}$ _____ 1.001
Calc. mol. wt _____ 150.2
Avg. exp. mol. wt _____ 152
Calc. molar refraction _____ 36.36
Exp. molar refraction _____ 36.47

Percent C:
    Calc. _____ 47.99
    Exp. _____ 48.09

Percent H:
    Calc. _____ 9.39
    Exp. _____ 9.41

EXAMPLE 4

In a similar manner the dibutyl 2-butoxy ethyl orthoformate may be prepared. To accomplish this, boron trifluoride (1.5 g., 0.02 mole) is passed into butyl orthoformate (232 g., 1 mole) at zero degrees. The resulting solution is then transferred to a one-liter three-neck flask equipped with stirrer, thermometer and an ice-water-cooled reflux condenser. The flask is then immersed in an ice bath and an additional mole of chilled butyl orthoformate is used to rinse the catalyst solution into the reaction flask. Ethylene oxide (1 mole) and butyl orthoformate (1 mole) at zero degrees are mixed and the resulting solution added to the catalyst solution with stirring over a period of approximately two hours. The temperature of the reaction mixture is maintained at between about 3 and 6° C.

After all the ethylene oxide solution is added, the mixture is stirred an additional three hours and treated with approximately 30 grams of anhydrous potassium carbonate in about 30 ml. of water. The mixture is again stirred for a short period of time, after which from 30 to 50 grams of anhydrous sodium sulfate is added to the reaction mixture and stirring continued an additional 30 minutes.

The solids are then filtered off and washed with ether with the mixture being distilled to remove decomposition products and excess butyl orthoformate. The final reaction product is then recovered.

The products of this invention may be used for a variety of purposes. The unique properties of these olefin oxide ortho ester condensation products make them particularly suitable as solvents. For example, the adduct isomers of the present invention may be used in preparing solvent cutback rust preventives similar to the manner in which Stoddard solvent is now used. Blends have been made using the product of Example 1 as a cutback solvent with petrolatum, black wax (M. P. 190°–195° F.), and microcrystalline wax. The products are suitable as low temperature dewaxing solvents and also as asphalt extractants.

In addition to their use as solvents, the new compounds of the present invention may be utilized as plasticizers. To demonstrate their suitability for this purpose, two solutions were prepared with Lucite powder (methacrylate polymer M. P. 300° F.—Buehler transoptic molding powder—clear). The first solution contained the Lucite powder dissolved in methylethyl ketone. The second solution contained in addition to the Lucite powder and methylethyl ketone, a small amount of the product of Example 1. These solutions were placed on glass plates and heated gently to remove the solvent and set the plastic. The sample prepared without the adduct product of Example 1 was hard and brittle, whereas the sample containing the product of Example 1 formed a flexible clear skin-like film.

While we have described our invention with some degree of particularity, it is to be understood that we intend to limit our invention only by the claims appended hereto.

We claim:

1. A compound having the generic formula

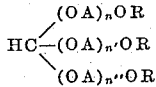

in which A is a bivalent hydrocarbon radical selected from the group consisting of ethylene and propylene; $n$ is an integer from 1 to 4 inclusive; $n'$ and $n''$ are any integers from 0 to 4 inclusive and R is an alkyl group having from 1 to 5 carbon atoms.

2. The compound diethyl 2-ethoxyethyl orthoformate.
3. The compound diethyl 2(2-ethoxyethoxy)ethyl orthoformate.
4. The compound diethyl 2(2-(2-ethoxyethoxy)ethoxy)ethyl orthoformate.
5. The compound ethyl 2-ethoxyethyl 2-(2-ethoxyethoxy)ethyl orthoformate.
6. The compound tris-2-ethoxyethyl orthoformate.

7. A process for preparing organic compounds having the generic formula

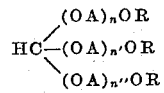

in which A is a bivalent hydrocarbon radical selected from the group consisting of ethylene and propylene; $n$ is an integer from 1 to 4 inclusive; $n'$ and $n''$ are any integers from 0 to 4 inclusive and R is an alkyl group having from 1 to 5 carbon atoms, which comprises reacting an olefin oxide selected from the group consisting of ethylene and propylene with an alkyl orthoformate in the presence of not more than 0.5% of boron trifluoride at a temperature between about 0° C. and 10° C.

8. A process for preparing organic compounds having the generic formula

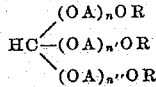

in which A is a bivalent hydrocarbon radical selected from the group consisting of ethylene and propylene; $n$ is an integer from 1 to 4 inclusive; $n'$ and $n''$ are any integers from 0 to 4 inclusive and R is an alkyl group having from 1 to 5 carbon atoms, which comprises reacting one molar proportion of an olefin oxide selected from the group consisting of ethylene and propylene with about six molar proportions of an alkyl orthoformate in the presence of not more than 0.5% of boron trifluoride at a temperature maintained between about 0° C. and 10° C.

9. A process for preparing organic compounds having the generic formula

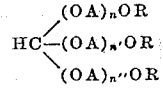

in which A is a bivalent hydrocarbon radical selected from the group consisting of ethylene and propylene; $n$ is an integer from 1 to 4 inclusive; $n'$ and $n''$ are any integers from 0 to 4 inclusive and R is an alkyl group having from 1 to 5 carbon atoms, which comprises reacting an olefin oxide selected from the group consisting of ethylene and propylene with an alkyl orthoformate in the presence of less than 0.5% of boron trifluoride at a temperature between about 0° C. and 10° C. until the reaction is complete, adding a basic material to neutralize the boron trifluoride and distilling the resulting mixture to separate the reaction products.

10. A process for preparing organic compounds having the generic formula

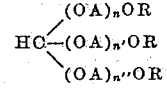

in which A is a bivalent ethylene radical; $n$ is an integer from 1 to 4 inclusive; $n'$ and $n''$ are any integers from 0 to 4 inclusive and R is an ethyl group, which comprises reacting about 3 molecular portions of ethyl orthoformate with about one half molecular proportion of ethylene oxide in the presence of about 0.02 mol of boron trifluoride at a temperature between about 3° C. and about 6° C.

11. A process for preparing organic compounds having the generic formula

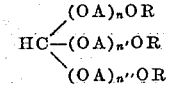

in which A is a bivalent ethylene radical; $n$ is an integer from 1 to 4 inclusive; $n'$ and $n''$ are any integers from 0 to 4 inclusive and R is a methyl group, which comprises reacting about 3 molecular proportions of methyl orthoformate with about one half molecular proportion of ethylene oxide in the presence of about 0.02 mol of boron trifluoride at a temperature between about 3° C. and about 6° C.

12. A process for preparing organic compounds having the generic formula

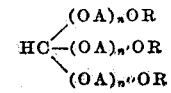

in which A is bivalent ethylene radical; $n$ is an integer from 1 to 4 inclusive; $n'$ and $n''$ are any integers from 0 to 4 inclusive and R is a butyl group, which comprises reacting about 3 molecular proportions of butyl orthoformate with about one half molecular proportion of ethylene oxide in the presence of about 0.02 mol of boron trifluoride at a temperature between about 3° C. and about 6° C.

13. A process for preparing organic compounds having the generic formula

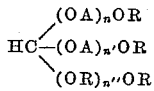

in which A is a bivalent propylene radical; $n$ is an integer from 1 to 4 inclusive; $n'$ and $n''$ are any integers from 0 to 4 inclusive and R is an ethyl group, which comprises reacting about 3 molecular proportions of ethyl orthoformate with about one half molecular proportion of propylene oxide in the presence of about 0.2 mol of boron trifluoride at a temperature between about 3° C. and about 8° C.

14. A process for preparing organic compounds having the generic formula

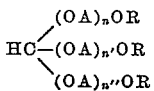

in which A is a bivalent propylene radical; $n$ is an integer from 1 to 4 inclusive; $n'$ and $n''$ are any integers from 0 to 4 inclusive and R is a methyl group, which comprises reacting about 3 molecular proportions of methyl orthoformate with about one half molecular proportion of propylene oxide in the presence of about 0.2 mol of boron trifluoride at a temperature between about 3° C. and about 8° C.

15. A process for preparing organic compounds having the generic formula

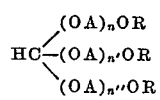

in which A is a bivalent propylene radical; $n$ is an integer from 1 to 4 inclusive; $n'$ and $n''$ are any integers from 0 to 4 inclusive and R is an ethyl group, which comprises reacting about 3 molecular proportions of ethyl orthoformate with about one half molecular proportion of propylene oxide in the presence of about 0.2 mol of boron trifluoride at a temperature between about 3° C. and about 8° C. until the reaction is complete, adding a basic material to neutralize the boron trifluoride and distilling the resulting mixture to separate the reaction products.

No references cited.

UNITED STATES PATENT OFFICE
Certificate of Correction

Patent No. 2,867,667 January 6, 1959

Otis C. Dermer et al.

It is hereby certified that error appears in the printed specification of the above numbered patent requiring correction and that the said Letters Patent should read as corrected below.

Column 5, line 54, for "1.9123" read —0.9123—; column 9, lines 11 to 14 inclusive, the formula should appear as shown below instead of as in the patent—

$$HC\begin{matrix}(OA)_nOR\\(OA)_{n'}OR\\(OA)_{n''}OR\end{matrix}$$

Signed and sealed this 19th day of May 1959.

[SEAL]

Attest:
KARL H. AXLINE,
*Attesting Officer.*

ROBERT C. WATSON,
*Commissioner of Patents.*